United States Patent [19]

Langhart

[11] Patent Number: 5,641,463

[45] Date of Patent: Jun. 24, 1997

[54] MECHANIZED TENT

[76] Inventor: Chris Langhart, 5872 Ridge Rd., RD 2 Box 265, New Hope, Pa. 18938

[21] Appl. No.: 486,922

[22] Filed: Jun. 7, 1995

Related U.S. Application Data

[63] Continuation of Ser. No. 327,125, Oct. 21, 1994, abandoned, which is a continuation of Ser. No. 922,584, Jul. 29, 1992, abandoned.

[51] Int. Cl.$^6$ .................... A01M 1/24; A01M 13/00
[52] U.S. Cl. .................. 422/294; 43/124; 422/28; 422/32; 422/292; 426/320
[58] Field of Search .................. 422/28, 32, 33, 422/292, 294, 306; 426/320, 331, 333, 335; 160/19; 135/106, 109, 115, 905, 508; 43/124–127

[56] References Cited

U.S. PATENT DOCUMENTS

| | | | |
|---|---|---|---|
| 645,890 | 3/1900 | Conrad | 135/908 |
| 4,033,367 | 7/1977 | Johnston | 135/905 |

Primary Examiner—Timothy McMahon

[57] ABSTRACT

A fumigation tent comprises a frame that can be suspended from the roof of a dock building by support cables. The frame has an underside to which a tarp is mounted. The tarp hangs from the frame defining a tent having a top and side curtains having a lower periphery that defines a bottom perimeter. Horizontal pipes are attached to, and arranged along, the side curtains of the tent at spaced intervals between the bottom perimeter of the tent and the top of the tent. Winch cables attached at one end to clew plates draw up the horizontal pipes. The clew plates can accommodate several winch cables and are connected by winch chains to motorized winches which operate together so that the tent remains substantially level when it is raised and lowered. Rings, disposed around the winch cables and attached to the horizontal pipes, gather up and support the tarp as the tent is being raised. The rings cooperate with the horizontal pipes to collect the tarp into a plurality of small bagouts or overhanging portions. A system comprising a flexible water hose mounted along the bottom perimeter is provided for sealing the tent to the floor of the dock building.

7 Claims, 4 Drawing Sheets

MECHANIZED TENT

This application is a continuation of U.S. patent application Ser. No. 08/327,125, filed on Oct. 21, 1994 now abandoned, which is a continuation of U.S. patent application Ser. No. 07/922,584, filed Jul. 29, 1992, now abandoned.

FIELD OF THE INVENTION

The present invention relates to a mechanized tent. In particular, it relates to a mechanized tent having a frame and a collectable tarp attached to the frame which can be raised and lowered over pallets of produce or the like.

BACKGROUND INFORMATION

Once fumigated, produce has a shelf life of at most ten days to two weeks. It is therefore desirable to fumigate the produce close to the place where it will be ultimately sold. For imported produce, this place is typically inside a dock building located at a port of entry. Pallets of the produce are unloaded from a ship and placed or staged on the floor of the dock building.

Known methods of fumigating produce involve covering the pallets of produce with a polyethylene or plastic impregnated tarpaulin and then introducing a gas, e.g., methyl bromide, under the tarp to kill live insect infestations. Workers climb on top of the pallets or use poles to pull the tarp over a group of pallets. Because it is necessary for the gas to circulate freely on all sides and the top of the pallets, the tarp cannot lay flat on the top of the pallets. The United States Department of Agriculture requires that a space of about two feet be provided on the top of the pallets, and at least one foot on their sides to allow room for the placement of fans to facilitate the circulation of the fumigation gas. The fans may be tied down with rope to prevent them from moving. A hose for introducing the gas is secured to the top of selected fans. The volume of space under the tarp, i.e., the total cubic feet, determines how many fans and points of introduction are required.

One method for maintaining the required space on the top of the pallets is to erect wood frames in the shape of a "T" at each corner and attach rope between each "T" to create a web of support for the tarp. The side space is maintained by draping the tarp outward as it contacts the floor of the dock building and securing it in that position by placing vinyl tubes (approximately 6" in diameter and 4' long) filled with sand on top of the edge of the tarp. At least 2 feet of excess tarp remains beyond the 'sand tubes'.

The steps involved in pulling the tarp over the pallets, setting up the fans, attaching the introduction hoses to the fans, handling hundreds of tubes of sand, and dismantling and storing all of the above equipment, and repeating the process upon completion, require many labor intensive hours.

Improvements to the conventional method of fumigating produce include permanently suspending the tarpaulin from an overhead frame and lowering the frame over the pallets as needed. Such a frame may be made from welded trusses to form a disassemblable one piece unit of varying dimensions. The typical frame size may be 50 feet long by 250 feet wide, but may be larger or smaller depending upon the spacing between support columns in the dock building. To the underside of the frame a tarpaulin is attached which has been manufactured with grommets, i.e., tabs and eyelets, specific to the frame it hangs from.

The frame may be raised and lowered by a system of cables and pulleys located above the unit which are attached to exposed barjoists on the roof of the dock building. The cables are connected to hand-operated winchs mounted on the support columns in the dock building. Workers simultaneously crank the winches to lower or raise the frame to a height above the pallets that allows the required 2 feet of space between the tarp and pallets of produce.

A typical tent may be lifted by twelve active pickup points. Between each of these points two counterweight sandbags are deployed to offset the self-weight of the frame and the polyethylene enclosure. Each truss section of the frame spans approximately fifty feet with two mid-point sandbags. These tend to become hung up from friction and pull at an angle to prevent the sandbag from lowering onto the polyethylene enclosure as it is elevated.

A difficult and time-consuming job associated with operating such a system is gathering up the tarp which overhangs on the sides of the frame before the frame is raised. This is necessary because the typical dock building height of about twenty-two feet is limited to about eighteen feet by overhead piping, electrical conduits, etc. When the support frame is raised to the maximum height permitted by these obstructions the tarp hangs down low enough to catch the tops of forklift trucks as they move the pallets of produce in and out of the tent area.

One known way of gathering up the tarp on the sides is to run horizontal plastic pipes through double-thickness portions of the tent walls which form pockets. These pockets can be located at approximately one-third and two-thirds of the wall height and are tied up to the top framing with rope every ten feet or so. Hand-pulled ropes raise the pockets and thus gather the sides of the tent. This method is also time-consuming, however, because it requires numerous tie-up procedures in order to completely raise the tent, e.g., usually at ten to twenty foot intervals around the tent perimeter.

OBJECTS AND SUMMARY OF THE INVENTION

It is an object of the present invention to provide a large fumigation tent for fumigating produce which can be quickly, conveniently and freely raised and lowered over pallets of the produce.

It is also an object of the present invention to provide a fumigation tent for fumigating produce that does not interfere with the operation of forklift trucks as they move pallets of the produce in and out of a tent area and that does not require extensive tie-up procedures to accomplish this.

Another object of the present invention is to provide a fumigation tent which can be raised from a single remote location so that personnel need not be near the tent area after fumigation is complete since exposure to residual gas, which may not have been evacuated from some pallet areas, is possible and can be harmful.

A further object of the present invention to provide a system which seals the tent to the floor of the dock building and which can be easily raised with tent.

The present invention provides a fumigation tent, comprising: a frame suspended from a structure by support cables, the frame having an underside; a tarp adapted to be mounted to the underside of the frame, the tarp hanging from the frame defining a tent having a top and side curtains having a lower periphery that defines a bottom perimeter; a plurality of horizontal pipes attached to, and arranged along, the side curtains of the tent at spaced intervals between the bottom perimeter and the top of the tent; a plurality of winch cables for raising the horizontal pipes; and rings, disposed around the winch cables and attached to the horizontal pipes, for gathering up and supporting the tarp as the horizontal pipes are raised, the rings and horizontal pipes cooperating with each other to collect the tarp into a plurality of small overhanging portions.

The present invention also provides a system for sealing a bottom perimeter of a lower periphery of side curtains of a tent to a floor, comprising: a flexible hose mounted along the bottom perimeter; a plurality of collapsible flexible hoses which supply water from elevated storage tanks located above the tent to the flexible perimeter hose; and one-way foot valves by-passed by solenoid valves, connected to the collapsible flexible hoses, which control columns of water to start the Venturi acceleration process to raise the water back to the elevated tanks. The flexible perimeter hose, after being gravity filled with the water to seal the tent to the floor, may be emptied allowing the tent to be raised without raising the weight of the water.

The present invention further provides for attachment of the winch cables to clew plates which in turn are attached to winches by winch chains. Preferably, the winches are motorized and can be operated by remote control. This provides an important safety advantage, because personnel do not have to be near the tent while it is being raised. Therefore, personnel can avoid being exposed to any lingering fumigation gas which is hazardous. It is also preferable that hand winches with cables be located near the motorized winches, so that they can be attached to the clew plates to provide emergency back up in case electrical problems occur.

Other advantages and characteristics of the present invention will become apparent in view of the description and accompanying drawings that follow.

DETAILED DESCRIPTION

Figure 1:
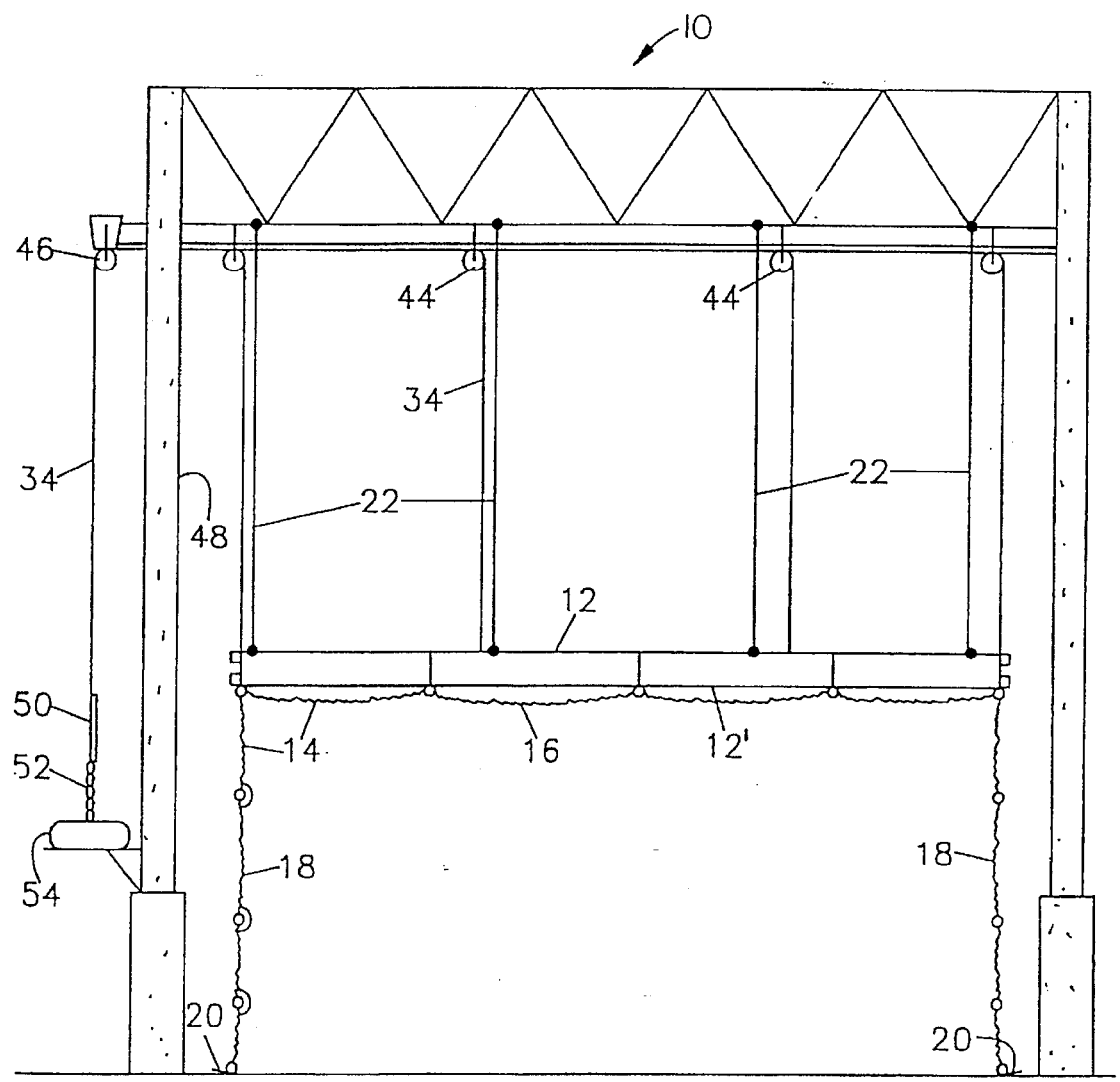
FIG. 1 is a cross-sectional schematic view of a fumigation tent of the present invention in its lowered position.

In FIG. 1, an apparatus for fumigating pallets of produce is indicated generally by the reference numeral 10. In the embodiment of the present invention illustrated, the apparatus 10 comprises a support system for uniformly raising and lowering a tarp enclosure while maintaining required clearances. The present invention provides for the motorization of the crank winches used for raising and lowering the tarp. Furthermore, it provides for relocation of frame support cables to vertical positions above the lifting position.

The apparatus 10 includes a frame 12 and a tarp 14 mounted to an underside of the frame 12'. The tarp 14 defines a tent having a substantially flat top 16 and side curtains 18 having a lower periphery which defines a bottom perimeter 20, as shown in FIG. 1. The frame 12 can be constructed out of aluminum pipes welded and bolted together in a truss-like configuration, however, as will be recognized by those skilled in the art, the frame can be of any shape and construction which is capable of carrying the weight of the tent. The frame 12 is suspended from the roof of a dock building by support cables 22.

Figure 2:
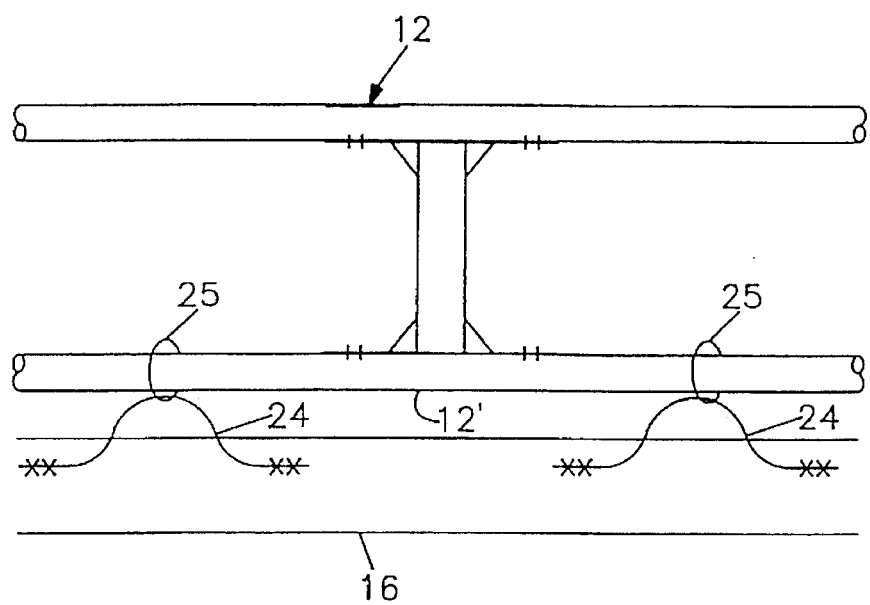
FIG. 2 is a partial side-sectional view of the frame of the tent in FIG. 1 as it is attached to the top portion of the tent.
Figure 3:
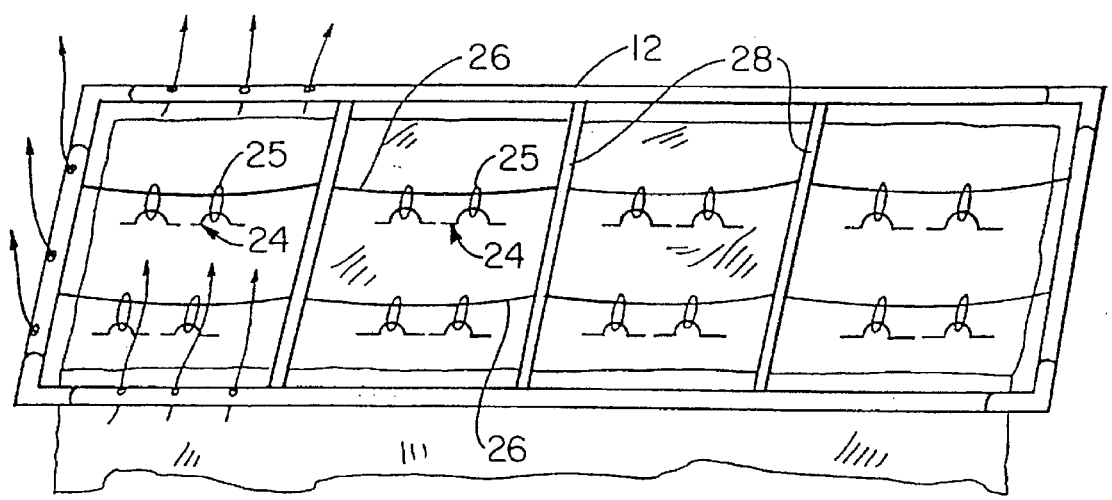
FIG. 3 is a top planar perspective view of the frame and the cables used to support the top middle portion of the tent.

The top 16 of the tent is mounted to the underside 12' of the frame 12 along its perimeter with tabs 24 and eye rings 25, e.g., plastic tie-wraps could be used, as shown in FIG. 2. So that the top 16 of the tent does not sag in the middle, it is fastened to cables 26 with tabs 24 and eye rings 25. The cables 26 hang between cross bars 28, spaced so that sagging of the top 16 is reduced, usually about every fifteen feet, along cross-sections of the frame 12, as shown in FIG. 3.

Figure 4:
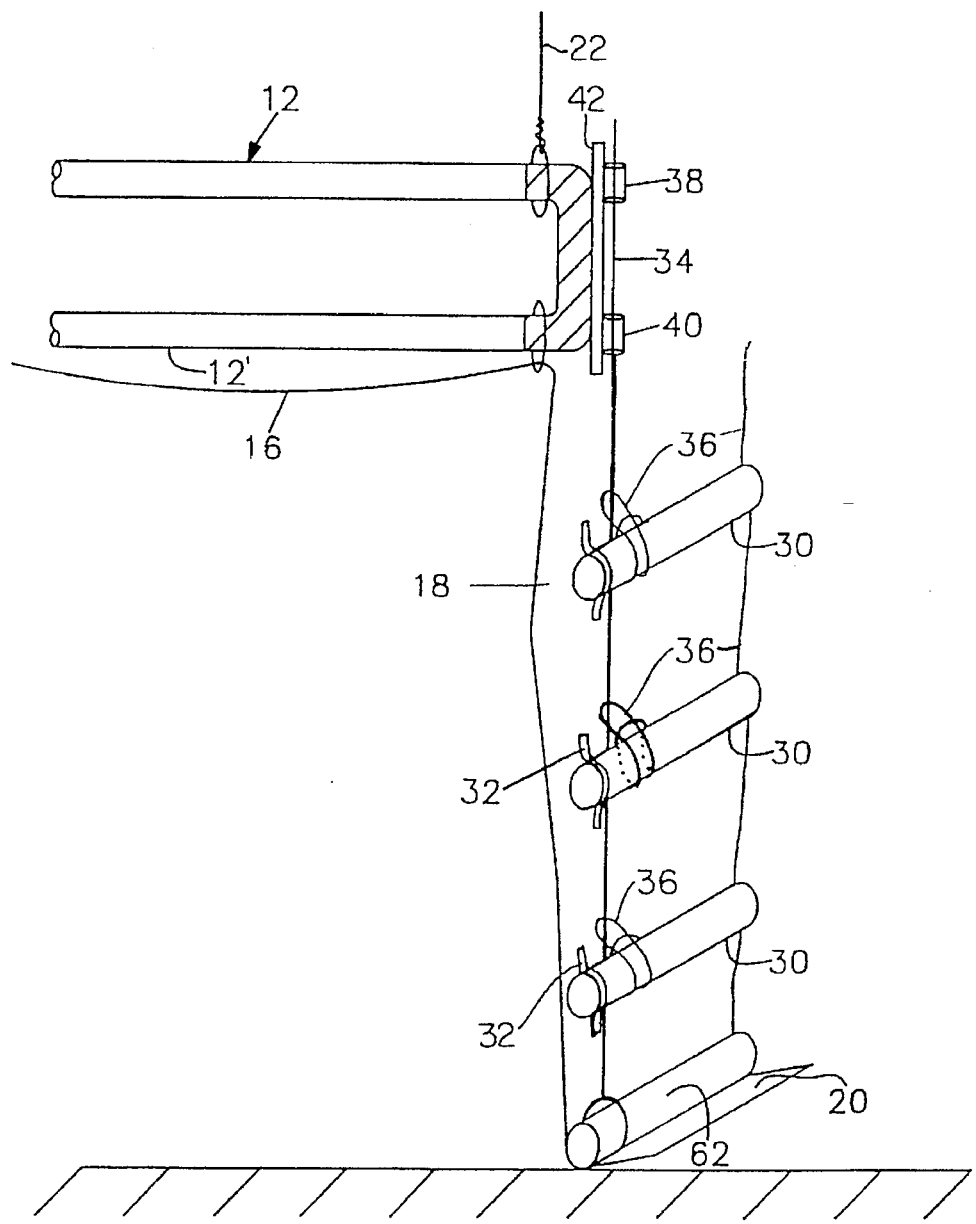
FIG. 4 is a partial perspective view of a side curtain of the tent with the horizontal bars and rings which are used to support and collect the side curtain while it is being raised.

Horizontal pipes 30 are fitted into tarpaulin pockets 32 formed in double-thickness portions of the side curtains 18, as shown in FIG. 4. In the embodiment illustrated in FIG. 4, the horizontal pipes 30 are located along the perimeter of the tent at three spaced intervals: the first interval is located just above the bottom perimeter 20 of the tent (e.g., approximately ten feet from the top); the second interval is located approximately one-third of the distance between the first interval and the top 16 of the tent; and the third interval is located approximately two-thirds of the distance between the first interval and the top 16 of the tent.

Winch cables 34 draw up the horizontal pipes 30. These cables pass through rings 36 attached along and at the ends of the horizontal pipes, as shown in FIG. 4. The tarpaulin pockets 32 are gathered up by the pipes 30, and support the tarp 14 as the horizontal pipes are being raised.

Each winch cable 34 passes through a pair of guide tubes 38 and 40 fixed to a plate 42 mounted on the frame 12, also shown in FIG. 4. The pair of guide tubes 38 and 40 and the plate 42 provide a means for enabling the frame to be lifted by the winch cables 34 once the horizontal pipes 30 are raised and the tarp is completely collected.

The winch cables 34 pass around pulleys 44 mounted to the roof of the dock building and around pulleys 46 mounted to support columns 48 in the dock building, as shown in FIG. 1. They are attached at their other ends to clew plates 50. Each clew plate 50 can accommodate up to seven or eight winch cables 34, and is attached by a winch chain 52 to a winch 54, as shown in FIG. 1. Winches 54, disposed on the support columns 48, draw down the clew plates 50 with the winch chains 52, enabling each fifty foot section of the frame 12 to be lifted at twelve points. Some of these points are shared with other sections along trusses 28 as required, as shown in FIG. 3.

The present invention provides for the mechanical gathering up of the side curtains 18 of the fumigation tent to permit forklift access when the frame 12 is in the raised position, i.e., where the tarp 14 is completely gathered up. The present invention provides for motorized winchs 54 combined with a cable arrangement to reduce the labor of hand cranking the winches. To insure level coordination of all support points, a central master motor control with individual winch subcontrols is provided. The chain winches themselves can be any commercially available chain winch.

Figure 5:
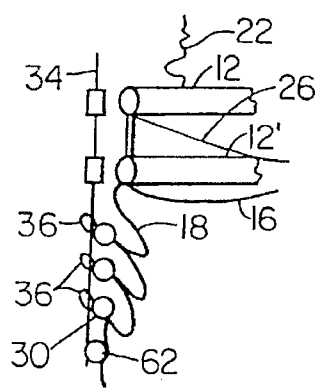
FIG. 5 is a side perspective view of a portion of the tent in its raised position.

In the operation of the present invention, the fumigation tent is raised by reeling in the clew plates 50 with the winches 54, such that the side curtains 18 are drawn upward by winch cables 34 via pulleys 44 and 46. As the winch cables 34 are drawn upward the horizontal pipes 30 on the first interval rise upward. This causes the rings 36 around the winch cables 34 between the first and second intervals of pipes to gather together, thus supporting and collecting intermediate portions of the side curtains 18, and thus preventing the side curtains 18 from "bagging out", i.e., overhanging, to half the height of the side walls of the tent. The rings 36, horizontal pipes 30, and pockets 32 distribute this bagout into several smaller bagouts located between the rings that surround the winch cables 34, so that the overhang created when the tarp 14 is completely gathered up is minimized, as shown in FIG. 5.

Once the first interval of horizontal pipes 30 is drawn up to the height of the second interval, the rings between the second and third intervals gather together supporting and collecting the intermediate portions of the side curtains 18. This process continues until all the horizontal pipes 30 and rings 36 are drawn up against the underside 12' of the frame 12. Once the side curtains 18 have been completely raised, and the tarp 14 collected, the winches 54 continue to draw up the winch cables 34, thus raising the frame 12. The winch cables 34 are drawn up until the frame 12 reaches a height which will enable forklift trucks to remove the pallets of produce without interfering with the fumigation tent. From the height where the side curtains 18 are completely gathered up to the height the frame 12 is finally raised to, the support cables 22, dead-tied to the roof of the dock building, become limp, i.e., in this interval the frame 12 is supported by the winch cables 34, as shown in FIG. 5.

The fumigation tent is lowered by drawing out the winch chains 52 which by the weight of the tent raise the clew plates and lowers the winch cables 34 via pulleys 44 and 46. The frame 12 is lowered until the support cables 22 prevent it from being lowered any further. Once the frame 12 reaches this point, the tarp 14 between the top 16 of the tent and the third interval begins to unfold until the horizontal pipes 30 in the third interval hang freely. Then, the tarp 14 between the third interval and the second interval begins to unfold until the horizontal pipes 30 in the second interval hang freely. This continues until the horizontal pipes 30 in the first interval hang freely. At this point, the side curtains 18 are completely unfolded and the tarp 14 hangs freely from the underside 12' of the frame 12 to the floor of the dock building, and the frame 12 is supported by the now tight support cables 22, thus creating an enclosed tent.

Figure 6:
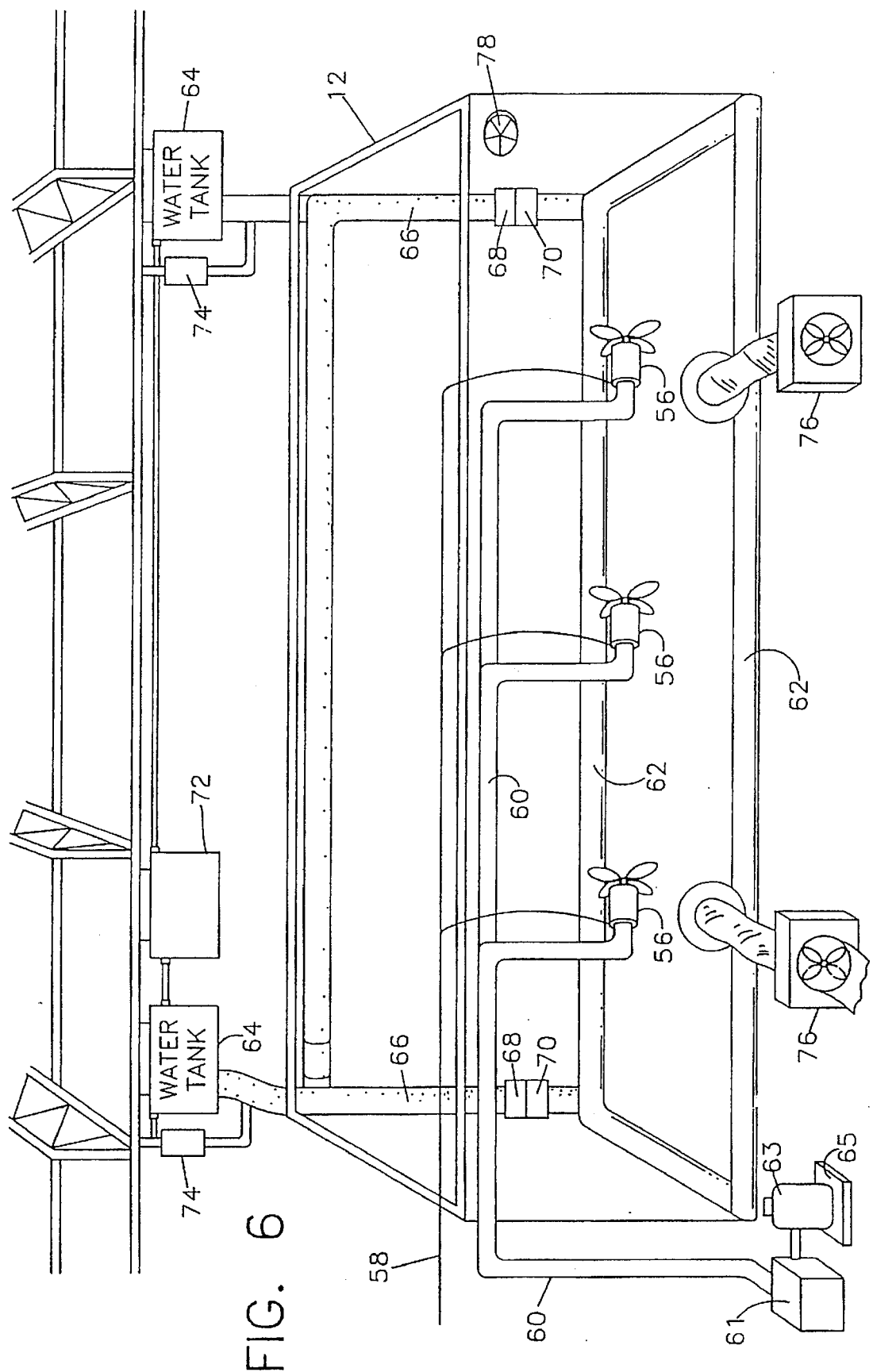
FIG. 6 is a sketch of the fumigation tent in its lowered positioned, a water supply and removal system, circulation and exhaust fans with their associated wiring, and components of the gas supply system.

The present invention also provides for mounting fans 56 and associated wiring 58 on the frame 12, as shown in FIG. 6. Entrance hoses 60 for supplying a fumigation gas are positioned near designated fan locations to insure dispersion by mixing concentrated heated gas into the accelerated airstream provided by fans 56. A portion of these hoses rise with the tent, requiring only four couplings to be made up with gas heaters 61 when the tent is lowered. A fumigation gas tank 63, which rests on a beam balance scale 65, supplies the fumigation gas to the heater 61.

Once the tent is in place over the pallets of produce, it must be sealed to the floor of the dock building to create a substantially airtight enclosure, and thus prevent fumigation gas from escaping into the dock building during the fumigation process. Several methods and apparatuses can be used for sealing the bottom perimeter 20 of the tent to the dock floor and removing the seal when the operation is complete so that the tent can be raised.

One prior art method of sealing the tent to the floor of the dock building involves mounting sand "snakes" to the bottom perimeter 20, so that the weight of the sand seals tent to the floor. The lifting of the sand snakes presents two difficulties, however. If the sand snakes are joined together like linked sausages and supported at practical intervals, they tend to sag between supports when in the raised position. Therefore, when the winch cables 34 are taut the snakes sag between cables 26 in a catenary-like curve. This sagging reduces the bottom perimeter 20 of the tent when lifted and reduces clearances for fumigant circulation around the produce or the tent capacity.

Another option for overcoming the sagging problem is to use a stiff spine pipe or bar support in the sand snake tube enclosure scheme and let the sand bag downward from this spine. This may not be flexible enough, however, to accommodate the contours in the floor of the dock building, and more importantly, would be too stiff to permit insertion of make-up air inlets and exhaust fans during the exhausting phase of the fumigation process.

Another possibility is to mount a magnetic material along the edge of the bottom perimeter 20 of the tent to engage with a strip plate secured and sealed along the floor of the dock building. A magnetic material like the flexible strips that stick on residential refrigerator doors could be used to attract to, and attach to, a flat iron strip flushly mounted to the floor of the dock building. The problem perceived here is that produce and cocoa bean spillage will deposit lumps of dried product compacted by forklift tires, thus preventing a seal. For this method to be workable, the iron strip would have be constantly maintained.

An improved method of sealing the tent to the dock floor, which forms a part of this invention, is to mount a flexible hose 62 along the bottom perimeter 20 of the tent and fill the hose with water, as shown in FIGS. 4 and 6. The weight of the water secures the tent to the floor of the dock building. The water can be reused by storing it in elevated tanks 64 located above the tent, preferably mounted to the roof of the dock building, as shown in FIG. 6. Collapsible flexible hoses 66 supply water from the elevated storage tanks 64 to the flexible perimeter hose 62. One-way foot valves 68 connected to the collapsible flexible hoses are employed to control columns of water to start the Venturi acceleration process for evacuation of the water from the perimeter hose 62. The foot valves 68 are by-passed by solenoid valves 70 to permit gravity filling of the hose. A compressor 72 supplies air pressure to the tops of the elevated storage tanks 64 to assist in the gravity filling of the flexible perimeter hose 62. Upon returning the water to the tanks, the compressor 72 blows the water from the hose 62 toward the foot valve location where it is carried up by the Venturi.

A water removal system is provided for evacuating the water from the flexible perimeter hose 62 comprising jet pumps 74 located above the tent, preferably mounted to the roof of the dock building, using low-mounted Venturi units which shoot the water up the collapsible flexible hoses 66 into the elevated storage tanks 64. Four distributed storage tanks limit the spilled water to one-quarter of the system's capacity. The compressor 72 can also supply air pressure through the collapsible flexible hoses 66 to assist in evacuating the water from the flexible perimeter hose 62, so that sections of the flexible perimeter hose do not collapse and trap water, thus preventing total water removal. Suction alone is not dependable for raising the water the required eighteen or so feet.

No hoses need be detached or connected for operation of the water weight perimeter system or during raising and lowering of the tent structure. All components of the water system may be under three hundred pounds each and can be temporarily installed and removed from the dock building. This eliminates the labor of handlaying "sandbag snakes" around the perimeter of the tent and the snagging of the side curtains 18 on the pallets when the tent is raised.

Once the fumigation process is complete, the fumigation gas is removed by exhaust fans 76 positioned on the floor of the dock building. These fans 76 are used to evacuate the interior of the fumigation tent before the tent is raised. Openings 78 in the tent re-introduce fresh air, as shown in FIG. 6. After approximately two hours of aeration, the tent is raised. It then takes approximately one additional hour for the fumigation gas to disperse to the level where dock personnel can enter the tent area safely.

As will be recognized by those skilled in the art, the present invention is not limited to fumigating produce. It can be used to fumigate any article or object that can be placed under the tent. Furthermore, it is contemplated that the present invention can be adapted to be transportable.

I claim:

1. A fumigation tent, comprising:

a structure;

support cables communicating with said structure;

a frame suspended from said structure by said support cables, said frame having an underside;

a tarp adapted to be mounted to the underside of the frame, the tarp hanging from the frame defining a tent having a top and side curtains having a lower periphery that defines a bottom perimeter;

a plurality of horizontal pipes attached to, and arranged along, the side curtains of the tent at spaced intervals between the bottom perimeter and the top of the tent;

a plurality of winch cables for raising the horizontal pipes; and rings, disposed around the winch cables and attached to the horizontal pipes, for gathering up and supporting the tarp as the horizontal pipes are raised, the rings and horizontal pipes cooperating with each other to collect the tarp into a plurality of small overhanging portions;

a flexible hose mounted along the bottom perimeter for holding water to seal the tent to a floor; and a plurality of collapsible flexible hoses which supply water from elevated storage tanks located above the tent to the flexible perimeter hose.

2. The fumigation tent as recited in claim 1, further comprising a compressor that supplies air pressure to the tops of the elevated storage tanks to assist in the gravity filling of the flexible perimeter hose.

3. The fumigation tent as recited in claim 2, further comprising one-way foot valves by-passed by solenoid valves, connected to the collapsible flexible hoses, which control columns of water to start the Venturi acceleration process to raise the water back to the elevated tanks.

4. The fumigation tent as recited in claim 3, further comprising a water removal system for evacuating the water from the flexible perimeter hose comprising jet pumps located above the tent using low-mounted Venturi units which shoot the water up the collapsible flexible hoses into the elevated storage tanks.

5. The fumigation tent as recited in claim 4, wherein the compressor supplies air pressure through the collapsible flexible hoses to assist in evacuating the water from the flexible perimeter hose, so that sections of the flexible perimeter hose do not collapse and trap water.

6. A system for fumigation, comprising:

a structure;

support cables communicating with said structure;

a frame suspended from said structure by said support cables, said frame having an underside;

a tarp adapted to be mounted to the underside of the frame, the tarp hanging from the frame defining a tent having a top and side curtains having a lower periphery that defines a bottom perimeter;

a plurality of horizontal pipes attached to, and arranged along, the side curtains of the tent at spaced intervals between the bottom perimeter and the top of the tent;

a plurality of winch cables for raising the horizontal pipes;

rings, disposed around the winch cables and attached to the horizontal pipes, for gathering up and supporting the tarp as the horizontal pipes are raised, the rings and horizontal pipes cooperating with each other to collect the tarp into a plurality of small overhanging portions;

a flexible hose mounted along the bottom perimeter;

a plurality of collapsible flexible hoses which supply water from elevated storage tanks located above the tent to the flexible perimeter hose; and one-way foot valves by-passed by solenoid valves, connected to the collapsible flexible hose, which control columns of water to start the Venturi acceleration process to raise the water back to the elevated tanks.

7. The system as recited in claim 6, further comprising multiple motorized winches connected to the winch cables which are controlled by a central master control allowing the tent to be raised from a single remote location.

* * * * *